United States Patent
Schneider et al.

[19]

[11] Patent Number: 6,062,665
[45] Date of Patent: May 16, 2000

[54] SWITCHGEAR CABINET

[75] Inventors: Thomas Schneider, Marburg; Michael Diebel, Dillenburg, both of Germany

[73] Assignee: Rittal-Werk Rudolf Loh GmbH & Co. KG, Herborn, Germany

[21] Appl. No.: 09/181,520

[22] Filed: Oct. 28, 1998

[30]      Foreign Application Priority Data

Oct. 31, 1997   [DE]   Germany ................ 197 48 234

[51] Int. Cl.[7] .................................................. A47B 47/00
[52] U.S. Cl. ................. 312/265.6; 312/236; 312/223.1; 312/257.1
[58] Field of Search .............................. 312/223.1, 236, 312/265.5, 265.6, 100, 257.1; 174/52.1; 11/101

[56]           References Cited

U.S. PATENT DOCUMENTS

| | | | |
|---|---|---|---|
| 3,274,451 | 9/1966 | Laity | 312/265.5 X |
| 4,515,143 | 5/1985 | Jabas | 312/236 X |
| 4,753,496 | 6/1988 | Bussard | 312/236 |
| 4,949,218 | 8/1990 | Blanchard et al. | 312/236 X |
| 5,407,263 | 4/1995 | Jones et al. | 312/265.6 X |
| 5,655,821 | 8/1997 | Laboch et al. | 312/100 |
| 5,782,174 | 7/1998 | Cohn et al. | 312/236 X |
| 5,801,331 | 9/1998 | Zachrai | 312/223.1 X |
| 5,851,143 | 12/1998 | Hamid | 312/236 X |

*Primary Examiner*—Jose V. Chen
*Assistant Examiner*—Hanh V. Tran
*Attorney, Agent, or Firm*—Pauley Petersen Kinne & Fejer

[57]           ABSTRACT

A switchgear cabinet with a cabinet body and a cover, wherein the cover projects with lateral shoulders past the lateral walls of the cabinet body, which extend in a direction of a cabinet depth of the cabinet body. Joining another switchgear cabinet adjacent a first switchgear cabinet is possible with a relatively small cost, if the lateral walls are embodied as separate elements and can be interchangeably connected with the cover or the cabinet body.

13 Claims, 1 Drawing Sheet

SWITCHGEAR CABINET

BACKGROUND OF THE INVENTION

1. Field of the Invention

This invention relates to a switchgear cabinet with a cabinet body and a cover, wherein the cover projects with lateral shoulders past the lateral walls of the cabinet body, which extend in a direction of a cabinet depth.

2. Description of Prior Art

Switchgear cabinets of this type are often employed at locations which are exposed to environmental elements. In this case the lateral walls act as water sluices, which lead the water running down from the cover away. If several switchgear cabinets need to be placed side by side, the individual covers have to be removed and exchanged for a cover extending over all lateral walls. The individual covers are no longer needed.

Therefore, expansion of an existing switchgear cabinet by adjoining it with others is very expensive.

SUMMARY OF THE INVENTION

It is one object of this invention to create a switchgear cabinet of the type mentioned above wherein it is possible with little outlay to join another switchgear cabinet to it.

In accordance with this invention this object is attained with lateral walls embodied as separate elements which can be interchangeably connected with the cover or the cabinet body.

Accordingly, the cover is constructed of several elements. To join another switchgear cabinet to the existing switchgear cabinet, it is only necessary to dismantle one or more of the lateral shoulders of the cover on a joining side. The cover itself can remain on the first switchgear cabinet.

In accordance with a preferred embodiment of this invention, an exterior wall is doubled on the lateral walls of the cabinet body extending in a direction of a depth of the cabinet, so that a ventilation shaft is formed between the lateral wall and the exterior wall. The ventilating shaft is in spatial connection via ventilation openings of the associated lateral shoulder with the ventilation chamber formed between the top of the cabinet body and the cover. Heat from the interior of the switchgear cabinet can be dissipated via the lateral wall into the ventilation shaft. Then warm air is conveyed in the direction toward the cover. Ventilation itself can take place via the cover.

In another preferred embodiment of this invention, the cover has a cover section to which lateral elements are attached, which extend in the direction of the cabinet depth of the cabinet body. The lateral elements are fastened with profiled holding elements on the cabinet body. The profiled holding elements have transport receivers, which are accessible from the top of the cover. A dependable force dissipation via the profiled holding elements during the transport of a switchgear cabinet is thus provided.

The profiled holding elements can be formed in a U-shape by two legs which are parallel to each other, and by a strip connecting them. The strips of the profiled holding elements can be aligned parallel with the respectively associated lateral wall of the cabinet body. One of the legs is fastened on the cabinet body and the second leg has the transport receiver. Two legs of the profiled holding elements are connected with each other by means of stiffeners. Thus, the profiled holding elements can be produced simply and cost-effectively. The bending-open of the profiled holding elements is dependably prevented, even if the switchgear cabinet to be transported has a great inherent weight.

For the dependable removal of water from the cover, it will preferably have a front and/or rear projection, with which it protrudes past the front, or respectively back of the cabinet body.

The lateral shoulder preferably is embodied as a hollow profiled section, which can be closed on both ends by covers. For example, it is then possible to cut the hollow profiled section to size from a semi-finished piece, so that a cost-effective manufacture becomes possible.

The lateral shoulder can have a vertical contact section, by which it can be fastened to the cover. The contact section preferably makes a transition into an oblique section sloping in a direction towards the ground, from which a vertical edge extends, which is maintained at a distance from the contact section. The water collected on the cover can be dissipated via the inclined oblique section.

Holders for fixing the covers in place are preferably installed at the front ends of the profiled holding elements.

BRIEF DESCRIPTION OF THE DRAWING

This invention will be explained in more detail in what follows by means of an exemplary embodiment represented in the drawing, wherein.

DESCRIPTION OF PREFERRED EMBODIMENTS

Figure 1:
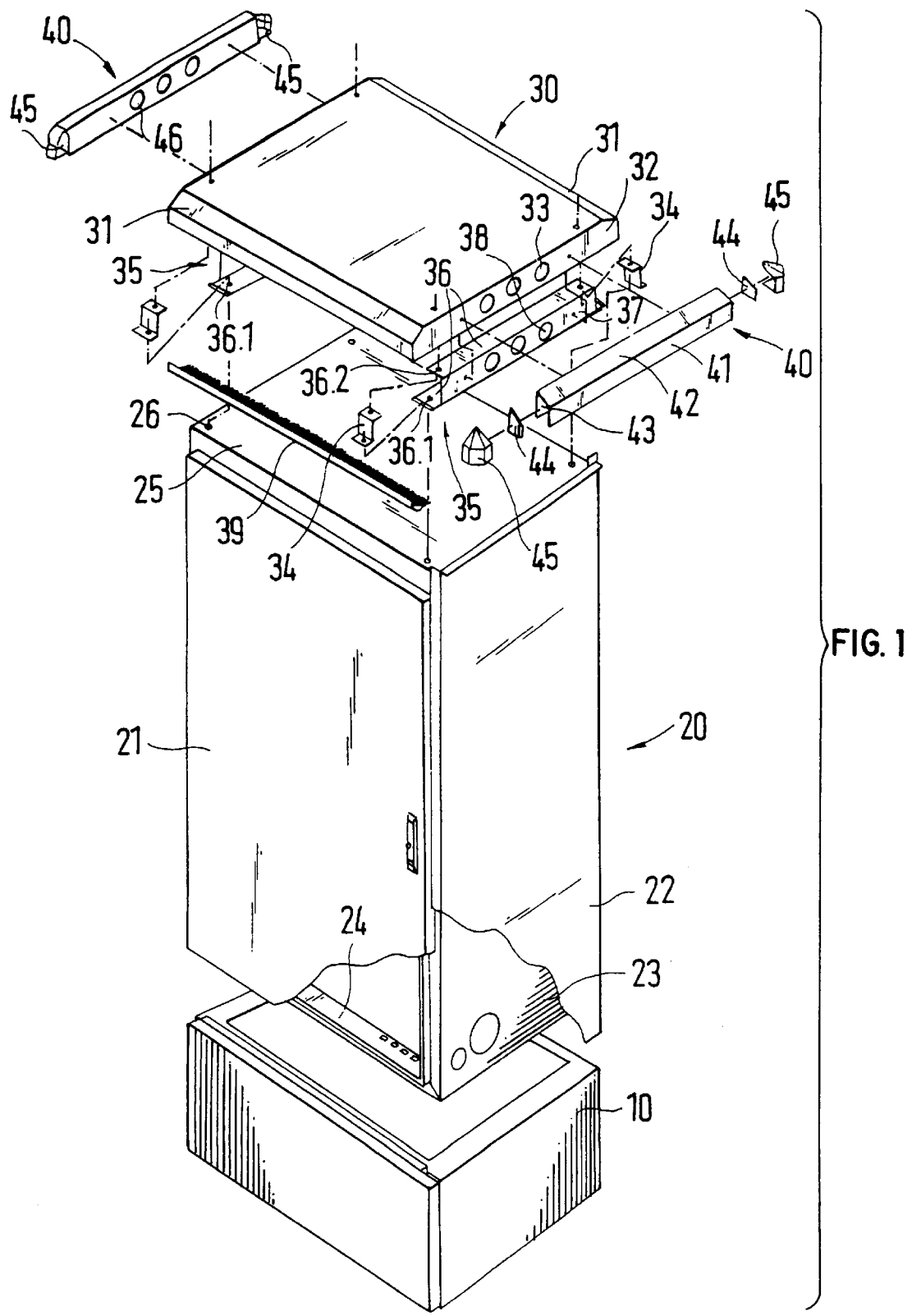
FIG. 1 represents one preferred embodiment of a switchgear cabinet in a perspective exploded view.

The switchgear cabinet has a cabinet body 20, which is placed on a base 10. The switchgear body 20 can be closed at the front by means of a cabinet door 21. The cabinet body 20 is laterally encased in lateral wall 23. An exterior wall 22 has been doubled at a distance from the lateral walls 23. In this way a ventilation shaft is created between the exterior wall 22 and the lateral wall 23. The ventilation shaft is open near the transition area towards the base 10.

The cabinet body 20 is closed at the top by means of a sheet metal cover 25. In its corner areas, the sheet metal cover 25 has openings providing access to transport receivers 26. The transport receivers 26 are installed in a frame 24 of the cabinet body 20.

A cover 30 can be placed on the sheet metal cover 25. The cover 30 has a level cover section, from which lateral elements 32 are beveled off at the sides. The cover 30 has a projection 31 at the front and the rear. The projection 31 extends over the front, or respectively rear of the cabinet body 20. The lateral elements 32 have ventilation openings 33. Profiled holding elements 35 are for fixing the cover 30 in place. The profiled holding elements 35 are designed as U-shaped profiled sections and have two legs 36, which are parallel to each other and are connected by a strip 37. The profiled holding element 35 can be placed on the sheet metal cover 25 with one of the legs 36. Thus, bores 36.1 in the lower leg 36 are arranged aligned with the transport receivers 26 of the sheet metal cover 25. A connection with the frame 24 can be provided by a screw connection. Stiffeners 34 can be applied between the two legs 36 at the front ends of the profiled holding elements 35. The stiffeners 34 connect the two legs 36 with each other. As shown in the drawing, the strip 37 of the profiled holding elements 35 have ventilation openings 38. The ventilation openings 38 can be aligned flush with the ventilation openings 33 of the cover 30. In this assembled position, the strip 37 rests on the inside against the lateral element 32. Lateral shoulders 40 are used for creating a lateral projection past the lateral walls 23. The lateral shoulders 40 are embodied as open hollow profiled sections and respectively have a vertical contact section 43, from which an oblique section 42 is beveled. The oblique section 42 slopes downward in the direction toward the ground. A beveled section 41 is bent off from the oblique section 42. The beveled section 41 extends parallel with the contact section 43. Holders 44 can be installed at the fronts of the lateral shoulders 40. The holders 44 are used as the fastening device for covers 45.

The unit, including the lateral shoulder 40 and the covers 45 can be attached to the lateral element 32 of the cover 30. In this case the contact section 43 rests against the lateral element 32. The contact section 43 has ventilation openings, which are aligned flush with the ventilation openings 33 and 38. The horizontal distance between the contact section 43 and the beveled section 41 is selected to match the width of the ventilation shaft between the lateral wall 23 and the exterior wall 22. It is thus possible to create a spatial connection between the ventilation shaft and the ventilation area between the cover 30 and the sheet metal cover 25.

Climate control of the assembled switchgear cabinet can be provided via the lateral walls 23 and the sheet metal cover 25. The heat from the interior of the switchgear cabinet is removed via these components. The heat then gets into the ventilation shaft, or respectively the ventilation space. The heated air can rise in the ventilation shaft and flows into the lateral shoulder 40. Via the ventilation openings 38, 33, the heated air then reaches the ventilation space between the cover 30 and the sheet metal cover 25. The heated air can then escape to the exterior via the projection at the front, or respectively the rear. The ventilation openings formed there can be covered with a dust protector 39.

If it is intended to join a further switchgear cabinet constructed in the same way to an assembled switchgear cabinet as shown in the drawing, this can be done without problems by removing the exterior wall 22 and the lateral wall 23. The lateral shoulder 40 must be disassembled from the cover 30 on the side where joining occurs. This results in a flat joining surface for the switchgear cabinet to be joined. One switchgear cabinet can be simply placed against another switchgear cabinet and securely fixed in place by conventional joining connectors. The cover 30 does not need to be removed during this process. A seal is applied between the two covers 30, so that no moisture can penetrate the interiors of the switchgear cabinets. The disassembled lateral shoulder 40 can again be installed at the free side of the joined switchgear cabinet.

What is claimed is:

1. In a switchgear cabinet with a cabinet body, a cover, and lateral shoulders extending in a direction of a cabinet depth, the improvement comprising:

removable and interchangeable lateral walls,
   the cover having a first projection extending over a front of the cabinet body and a second projection extending over a back of the cabinet body,
   the lateral shoulders laterally projecting past the lateral walls, the lateral shoulders (40) each having a vertical contact section (43) for fastening to the cover (30), and
   the contact section (43) transitioning into an oblique section (42) sloping in a second direction towards ground from which a vertical edge (41) extends, which is maintained at a distance from the contact section (43).

2. In the switchgear cabinet in accordance with claim 1, wherein
   an exterior wall (22) is doubled on each of the lateral walls (23) of the cabinet body extending in the direction of the cabinet depth and forms a ventilation shaft between each of the lateral walls (23) and the exterior wall (22), and
   the ventilation shaft is in spatial connection via ventilation openings of an associated one of the lateral shoulders (40) with a ventilation chamber formed between the top of the cabinet body (20) and the cover (30).

3. In the switchgear cabinet in accordance with claim 2, wherein
   the cover (30) has a cover section to which a plurality of lateral elements (32) are attached, which extend in the direction of the cabinet depth of the cabinet body (20),
   the lateral elements (32) are fastened by a plurality of profiled holding elements (35) on the cabinet body (20), and
   the profiled holding elements (35) have a plurality of receivers (26) accessible from a top of the cover (30).

4. In the switchgear cabinet in accordance with claim 1, wherein
   the cover (30) has a cover section to which a plurality of lateral elements (32) are attached, which extend in the direction of the cabinet depth of the cabinet body (20),
   the lateral elements (32) are fastened by a plurality of profiled holding elements (35) on the cabinet body (20), and
   the profiled holding elements (35) have a plurality of receivers (26) accessible from a top of the cover (30).

5. In the switchgear cabinet in accordance with claim 1, wherein the cover (30) protrudes with at least one of a front and a rear projection (31) past the cabinet body (20).

6. In the switchgear cabinet in accordance with claim 1, wherein each of the lateral shoulders (40) is embodied as a hollow profiled section which is closed off on each of a first end and a second end by a cover (45).

7. In the switchgear cabinet in accordance with claim 1, wherein a plurality of holders (44) are installed at a plurality of front ends of the profiled holders (44) on which the covers (45) are fixed.

8. In a switchgear cabinet with a cabinet body, a cover, and lateral shoulders extending in a direction of a cabinet depth, the improvement comprising:

removable and interchangeable lateral walls,
   the cover having a first projection extending over a front of the cabinet body and a second projection extending over a back of the cabinet body,
   the lateral shoulders laterally projecting past the lateral walls,
   an exterior wall (22) doubled on each of the lateral walls (23) of the cabinet body extending in the direction of the cabinet depth and forming a ventilation shaft between each of the lateral walls (23) and the exterior wall (22),
   the ventilation shaft in spatial connection via ventilation openings of an associated one of the lateral shoulders (40) with a ventilation chamber formed between the top of the cabinet body (20) and the cover (30),
   the cover (30) having a cover section to which a plurality of lateral elements (32) are attached, extending in the direction of the cabinet depth of the cabinet body (20),
   the lateral elements (32) fastened by a plurality of profiled holding elements (35) on the cabinet body (20),
   the profiled holding elements (35) having a plurality of receivers (26) accessible from a top of the cover (30),
   each of the profiled holding elements (35) forming a U-shape with two legs (36) which are parallel to each other and by a strip (37) connecting the two legs (36), the strips (37) of each of the profiled holding elements (35) aligned parallel with the associated one of the lateral walls (23) of the cabinet body (20), one of the legs (36) fastened on the cabinet body (20) and the other of the legs (36) having the transport receivers (26), and the two legs (36) of the profiled holding elements (35) connected with each other by stiffeners (34).

9. In the switchgear cabinet in accordance with claim 8, wherein the cover (30) protrudes with at least one of a front and a rear projection (31) past the cabinet body (20).

10. In the switchgear cabinet in accordance with claim 9, wherein the lateral shoulders (40) each is embodied as a hollow profiled section which is closed off on both ends by covers (45).

11. In the switchgear cabinet in accordance with claim 10, wherein the lateral shoulders (40) each have a vertical contact section (43) for fastening to the cover (30), and the contact section (43) transitions into an oblique section (42) sloping in a second direction towards ground from which a vertical edge (41) extends, which is maintained at a distance from the contact section (43).

12. In the switchgear cabinet in accordance with claim 11, wherein a plurality of holders (44) are installed at a plurality of front ends of the profiled holders (44) on which the covers (45) are fixed.

13. In a switchgear cabinet with a cabinet body, a cover, and lateral shoulders extending in a direction of a cabinet depth, the improvement comprising:

removable and interchangeable lateral walls, the lateral shoulders laterally projecting past the lateral walls, the cover having a first projection extending over a front of the cabinet body and a second projection extending over a back of the cabinet body, and a cover section to which a plurality of lateral elements (32) are attached, the lateral elements (32) extending in the direction of the cabinet depth of the cabinet body (20), the lateral elements (32) fastened by a plurality of profiled holding elements (35) on the cabinet body (20), the profiled holding elements (35) having a plurality of receivers (26) accessible from a top of the cover (30), the profiled holding elements (35) forming a U-shape with two legs (36) which are parallel to each other and by a strip (37) connecting the two legs (36), the strips (37) of each of the profiled holding elements (35) aligned parallel with the associated one of the lateral walls (23) of the cabinet body (20), one of the legs (36) fastened on the cabinet body (20) and an other of the legs (36) having the transport receivers (26), and the two legs (36) of the profiled holding elements (35) connected with each other by stiffeners (34).

* * * * *